Dec. 29, 1970  E. O. FORSTER  3,551,199
WIRE COATING COMPOSITION AND MICROWAVE HEATING CURING PROCESS
Filed Nov. 20, 1967  2 Sheets-Sheet 1
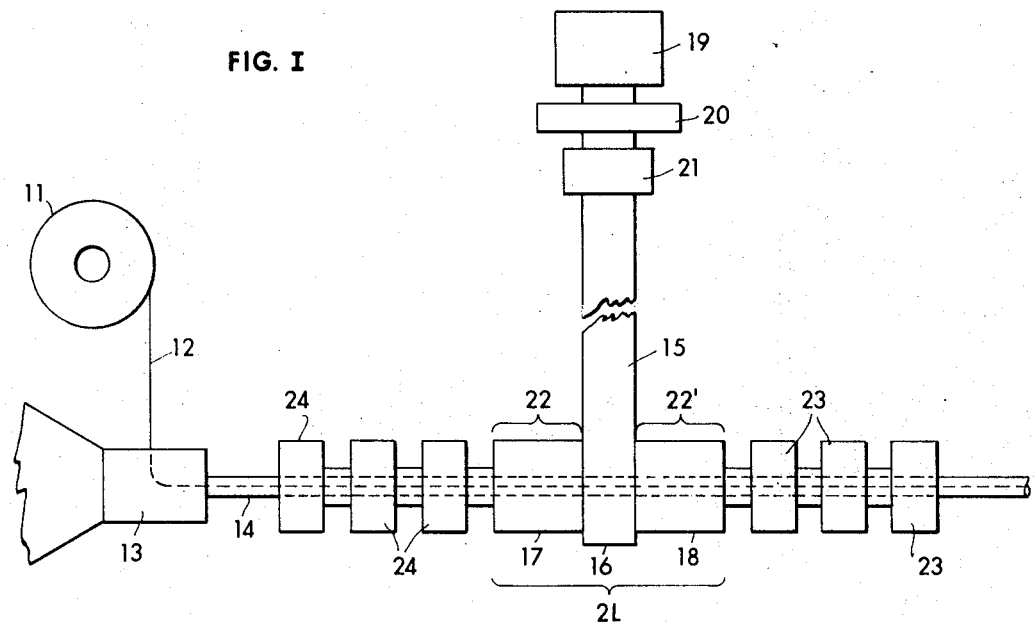
FIG. I
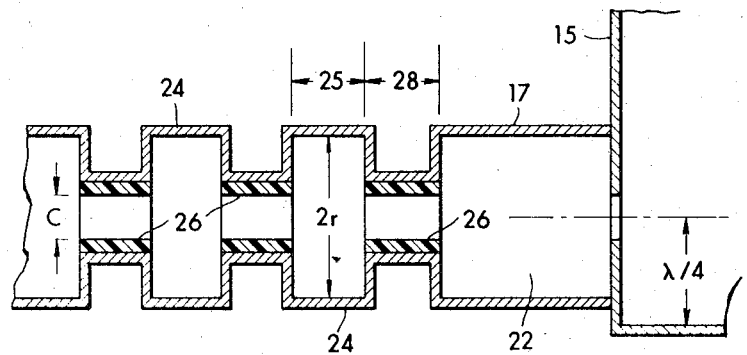
FIG. IIa
E. O. Forster INVENTOR
BY Jack Matalon
PATENT ATTORNEY FIG. IIb
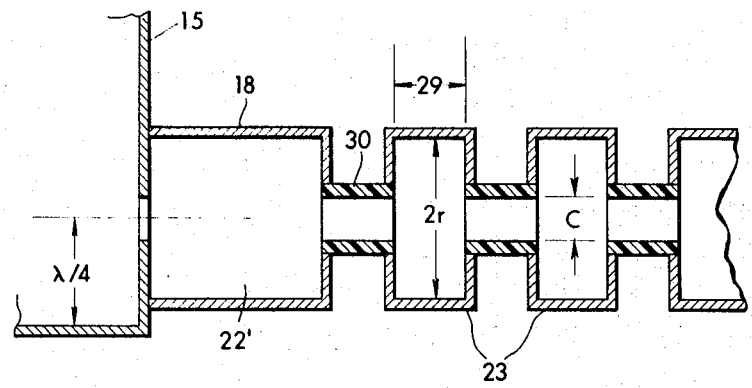
FIG. IIc
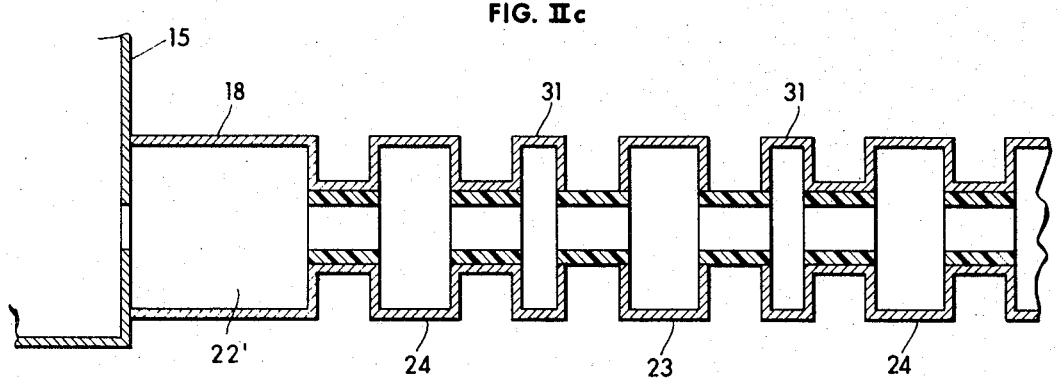

United States Patent Office 3,551,199
Patented Dec. 29, 1970

3,551,199
WIRE COATING COMPOSITION AND MICROWAVE HEATING CURING PROCESS
Eric O. Forster, Scotch Plains, N.J., assignor to Esso Research and Engineering Company, a corporation of Delaware
Filed Nov. 20, 1967, Ser. No. 684,139
Int. Cl. B44d 1/50; H01b 3/28, 3/20
U.S. Cl. 117—227                7 Claims

ABSTRACT OF THE DISCLOSURE

An electrical conductor is insulated by coating with a curable polymeric composition comprising about 1 to about 18 wt. percent of metal particles less than 10 microns in diameter. Said composition is cured by microwave heating, which is accomplished within a coaxial line coupled to a wave guide.

BACKGROUND OF INVENTION

Wire is coated with electrical insulation by various means. Typically a thermoplastic such as polyethylene may be extruded onto a wire using a cross head extrusion die. Alternately, a vulcanizable rubber such as Ethylene Propylene Diene Monomer (EPDM) may be blended with curatives and cross head extruded over the wire to be insulated. The extrustion process may be preformed at a temperature insufficient to activate the cure system or as generally is the case, at a temperature which initiates vulcanization with further curing being accomplished in a tunnel oven.

Various electronic heating techniques have been developed to cure vulcanizable polymers. For example, ferromagnetic or electrically conductive particles of less than 100 microns in size are blended into a synthetic rubber and cured by induction heating at a frequency of about 1 mHz. Induction heating, as the name implies, operates by inducing eddy current, utilizes electromagnetic coupling, in the ferromagnetic or electrically conductive particles thereby heating the particles. The surrounding rubber matrix is heated and cured by conduction from the particles, e.g. see U.S. Pat. 3,249,658.

Dielectric heating has been used to heat non-conductors having polar molecules. For example, polyvinyl chloride may be pressed into molding "pre-forms" and preheated by dielectric heating prior to introduction into a compression mold. This heating technique relies on the high polarity of the molecule to induce a heating effect. The material to be heated is placed between two plates which form a capacitance in an electronic circuit. The polarity of the plates is rapidly reversed at a frequency in the range of about 1 to about 300 mHz. Heat is caused by the rapid vibration of the polar molecules attempting to align themselves with the constantly changing field.

The degree of heating is related to the dielectric loss of the material, that is, the energy dissipated in the dielectric. In general, the higher the frequency at which the dielectric heating is accomplished the greater the "lossiness" of the material and consequently, the more efficient the energy conversion to heat. Additionally at the higher frequencies, the requirement for shielding is reduced.

These advantages to very high frequency dielectric heating have stimulated much research in the use of a technique termed microwave heating. Microwave heating is based on the principle that electromagnetic waves interact with a dielectric material, some of the energy associated with these waves being stored and some being dissipated. The heating effect is a result of the dissipated energy (dielectric loss). The dielectric loss is caused by the frictional drag associated with permanent or induced dipole orientation in the alternating electric field.

The term "microwave heating" as used throughout the specification and claims means heating with electromagnetic radiation at about 800 to 30,000 mHz.; preferably 900 to about 8600 mHz.; most preferably at about 915 to about 2450 mHz. At these frequencies it is no longer necessary to confine the material to be heated between plates of a capacitor. The electromagnetic radiation may be conducted, much like any other fluid, by means of wave guides to the heating zone.

Though all polymer molecules exhibit some polarity, with few exceptions, however, the synthetic elastomers are essentially nonpolar and hence have a low dielectric loss at the lower frequencies. In the microwave range it is possible to accomplish some heating due to increased lossiness at the higher frequency. Thus, it is possible to cure natural or synthetic rubber as it leaves an extruder head by passing it through a microwave oven. The material is partially cured by being passed through the center of a helical metal wave guide which is connected to a microwave generator running at 300 to 30,000 mHz. Curing is completed by passing the material through a conventional heater, e.g. see British Pat. 1,065,971.

In order to effect a complete cure of such essentially nonpolar synthetic polymers by microwave heating, it is generally necessary to use large amounts of inert fillers such as carbon black, the actual heating being accomplished primarily by thermal conduction from the fillers which are readily heated by electromagnetic radiation.

So far as this inventor is aware, it has not been heretofore possible to apply microwave heating to wire coating operations for several reasons. The non-uniform size of the inert fillers results in non-uniform heating which causes hot spots and burn-out of the relatively thin insulation coating. Furthermore, the wire, being a conductor, acts as an antenna and transmits energy along its length resutling in high energy losses. Thus, the energy available for heating is reduced to insignificant levels.

SUMMARY OF INVENTION

It has now been found that synthetic polymers can be successfully cured in wire coating operations by filling the polymer with finely-divided metal particles and using coaxial line/wave guide coupling techniques to heat the polymer to cure temperatures with microwave heating.

The filler material particle size is critical and must be less than 10 microns.

The wire to be coated acts as the center conductor of the coaxial line. To reduce energy losses along the center conductor, the coaxial line, which extends to either side of the wave guide, is equipped with cavities or baffles which attenuate the losses to tolerable limits.

DETAILED DESCRIPTION

Any vulcanizable, extrudable elastomer may be used in the practice of this invention. Typical of such vulcanizable elastomers are natural rubber, butyl rubber, halogenated butyl rubber, Ethylene Propylene Diene Monomer (EPDM) and neoprene rubbers.

Saturated peroxide crosslinkage polymers such as polypropylene, polyethylene and ethylene propylene rubber may also be cured by the technique of this invention.

In addition to solid elastomers and polymers, plastisols may be used as the coating material, for example, a plastisol of PVC having a curing temperature of about 330° F. and a room temperature viscosity in the uncured state of 160,000 cps., having suspended therein the metal fillers of this invention, may be coated on a wire and cured by microwave heating.

The expression "butyl rubber" as employed in the specification and claims is intended to include copolymers made from a polymerization reactant mixture having therein about 70–99.5% by weight of an isoolefin which has about 4–7 carbon atoms and about 30–0.5% by weight of a conjugated multiolefin having about 4–14 carbon atoms. The resulting copolymer contains 85–99.5% of combined isoolefin and 0.5 to 15% of combined multiolefin. The term "butyl rubber" is described in an article by R. M. Thomas et al. in Industrial Engineering and Chemistry, vol. 32, p. 1283 et seq., October 1940.

The butyl rubber generally has a Staudinger molecular weight between about 20,000 to about 500,000; preferably about 25,000 to about 200,000; especially 45,000 to 60,000; and a Wijs Iodine No. of about 0.5 to about 50; preferably 1 to 15. The preparation of butyl rubber is described in U.S. Pat. 2,356,128, which is incorporated herein by reference.

The term "EPDM" is used in the sense of its definition as found in ASTM D–1418–64 and is intended to mean a terpolymer containing ethylene and propylene in the backbone and a diene in the side chain. Illustrative methods for producing these terpolymers are found in U.S. Pat. 3,280,082 and British Pat. 1,030,989, which are incorporated herein by reference.

Any EPDM may be used in the practice of this invention. The preferred polymers contain about 50 to about 70 wt. percent ethylene and about 2.0 to about 5 wt. percent of a diene monomer, the balance of the polymer being propylene. Preferably, the polymer contains about 50 to about 60 wt. percent ethylene, e.g. 56 wt. percent, and about 2.6 to about 4.0 wt. percent diene monomer, e.g. 3.3 wt. percent.

The diene monomer is preferably a nonconjugated diene. Illustrative of these nonconjugated diene monomers which may be used in the terpolymer (EDPM) are hexadiene, dicyclopentadiene, ethylidene norbornene, methylene norbornene, propylidene norbornene and methyl tetrahydroindene. The particular diene used does not form a critical part of this invention and any EPDM fitting the above description may be used. A typical EPDM is Vistalon 4504 (Enjay Chemical Company) a polymer having a Mooney viscosity at 212° F. of about 40, prepared from a monomer blend having an ethylene content of about 56 wt. percent and a nonconjugated diene content of about 3.3 wt. percent.

Neoprene rubbers are described in a text entitled The Neoprenes by Murray and Thompson; DuPont, March 1963. There are two general types of neoprenes, "G" type and "W" type. The "G" types differ from the "W" type in that the former are interpolymerized with sulfur and contain thiuram disulfide, whereas the "W" type neoprenes contain no elemental sulfur, thiuram disulfide or other compound capable of decomposing to yield either free sulfur or a vulcanization accelerator.

The term "plastisol" as used in this specification means a dispersion of finely divided resin in a plasticizer. When the plastisol is heated, the plasticizer solvates the resin particles, and the mass gels. With continued application of heat, the mass fuses to become a conventional thermoplastic material. The preparation of plastisols is well known to the art and will not be discussed in detail.

Illustrative of a plastisol suitable for use in this invention is one hundred parts by weight of a dispersion grade polyvinyl chloride dispersed in 65 parts by weight base on the PVC of a plasticizer such as diethylhexyl phthalate.

Though this invention is directed toward the curing of coatings which have been extruded on a wire, it is not intended to be limited solely to that method of coating application.

The term "curable" as used in the specification and claims is intended to cover the range of materials described above which may be vulcanized, crosslinked by peroxide cures or cured in the sense of converting a plastisol to a thermoplastic.

It will be readily evident to one skilled in the art that expandable polymer formulations may be used in the practice of this invention. The preparation of expandable preparations is well known to the art.

Typically, a suitable polymer, e.g. PVC, polyethylene, etc., is compounded with blowing agents such as azo compounds, N-nitroso compounds and sulfonyl hydrazides. The blowing agent, e.g. azodicarbonamide, must be selected so as to not decompose during the extrusion coating phase of the process. Decomposition temperature of available blowing agents is known to those skilled in the art; hence, the preparation of these compositions will not be discussed in detail.

In addition to being used to cure polymers coated on electrical conductors, the process disclosed herein is suitable for use in drying paper wrapped conductors. In some electrical products, e.g. transformers, the wire is wrapped with paper or other cellulose insulators from which moisture must be removed. The apparatus and method of this invention may be used to remove that moisture.

Illustrative of the metals suitable for use in the practice of this invention are iron, aluminum, copper, nickel, tin, zinc, and alloys of nickel with cobalt. In principle, any metal may be used. Such metals a the noble metals, however, are excluded purely by economic considerations though they would form operable embodiments of this invention.

Metals such as tin or zinc may be reduced to the proper particle size by mechanical grinding in methanol at −40° C. (Heusler technique).

The other metals, iron, for example, may be reduced to the proper particle size by preparing alloys with other elements which are removable by water, weak acids or alkali. Examples of such other elements are aluminum, silicon, sodium, calcium or magnesium.

For example, an alloy of nickel and aluminum containing about 50 to about 70% aluminum is prepared, annealed at about 800–1000° C. for several hours, and quenched to prevent a phase separation of the two metals. The alloy is then converted to a powder (ca. 200–325 mesh). The aluminum is dissolved in alkali; usually a 20% water solution of NaOH, the powder reacting readily with the cold solution with liberation of hydrogen. The heat generated by the reaction brings the liquid to a boil. The water, escaping as steam, is replaced in order to maintain the volume of solution. Finally, the mass is digested for several hours at 118–120° C.

The nickel sludge in the tank is washed free of lye with cold water. The finely divided nickel is then dried by adding an organic solvent or oil, heating and agitating until the drying is complete. If desired, the oil may be a process oil which would ordinarily be used in compounds the elastomer to be coated onto the wire.

In the practice of this invention, the metal particle size is of critical importance and must be less than 10 microns, i.e. 0.5 to about 10 microns.

It is quite surprising that the products of the present invention are nonconductors of electricity. It has been found that within limits, the dielectric constant of the metal-filled polymer increases with increasing metal filler particle size and yet the prior art products which make use of large pratricle size metal fillers are excellent electrical conductors; indeed, the prior art products have been suggested for use as the plates of capacitors and not as the dielectric medium between the plates, see "Metal-Filled Plastics," page 195, by John Delmonte, Reinhold Publishing Corp. (New York, 1961). Furthermore, it would be expected that the electrical conductivity of the metal-filled polymers would rise sharply with increased loadings of metal particles, e.g. see U.S. Pat. 3,211,584, issued Oct. 13, 1965 to J. E. Ehrreich. However, it has been unexpectedly found that the electrical conductivity of the present metal-filled polymers rises imperceptibly in contrast to the almost asymptotic rise in the dielectric constant at high levels of metal loadings.

If the metal particles are substantially greater than 100 microns, there will be metal to metal contact and the elastomer filled with the metal will be conductive and useless as a wire insulation. Between about 20 to 100 microns the metal particles are sufficiently large to act as antennae. Hence, they will reirradiate substantial amounts of the electromagnetic energy absorbed, thereby reducing the heating efficiency to a very low level. Between about 10 to about 20 microns the metal particles do not act as antennae but their area to mass ratio is such that heat transfer to the surrounding elastomer matrix is slow. Hence, overheating of the metal particles results with subsequent hot spots and burn-out of insulation. Below 10 microns, on the other hand, the area to mass ratio is such that heat transfer to the surrounding matrix is rapid enough to result in uniform heating of the elastomer without localized overheating in the vicinity of the metal particles. Preferably, the particles have a particle size range of 0.5 to about 10 microns with an average particle size of about 5 microns.

An additional advantage of the small particle size is that the metal acts as a reinforcing filler in much the same manner as inorganic or carbon black reinforcing fillers.

In its more preferred embodiment the metal fillers of this invention have a particle size range of less than 1.5 microns. Preferably, the particles are made up of about ⅓ of particles in the 1–1.5 micron range, ⅓ in the 0.5–1 micron range and ⅓ in the 0.5 micron range.

Metal particles of such small particle size are notoriously pyrophoric and are normally handled under water or solvent. In order to utilize such conventional blending means as rubber mills, banking mixers, etc., to incorporate the metal fillers into the polymers, it is necessary to treat the metal particles to eliminate pyrophoric tendencies.

It has been found that treating the metal particles with organosilanes, in particular vinyl silanes, results in a silane coating on the particle which allows it to be safely handled in air. Metal particles so treated may be readily blended into polymers on conventional equipment without any danger.

The term "organosilane compound" as employed herein includes silanes, silanols (the corresponding partially or completely hydrolyzed forms of silane), siloxanes (the corresponding condensation product of the silanols) and mixtures thereof. The organosilane compound may be represented by the formula:

wherein $R_1$ is a $C_2$–$C_{16}$ radical containing vinyl-type unsaturation selected from the group consisting of alkenyl, styryl, alkenoylalkyl and alkenoyloxyalkyl; X is selected from the group consisting of hydroxyl, alkoxy and acyloxy; $R_2$ and $R_3$ are independently selected from the group consisting of hydroxyl, methyl, alkoxy, acryloxy and $R_1$. Nonlimiting useful compounds which may be employed are the following: vinyl tri(beta-methoxyethoxy)-silane, vinyl triethoxy silane, divinyl diethoxy silane, allyl tri-acetoxy silane; and in place of the vinyl and allyl groups of the above-named compounds, the corresponding styryl, acryloalkyl, methacryloalkyl, acryloxy propyl and methacryloxy propyl compounds. All of the silanes are convertible into the useful corresponding silanols by partial or complete hydrolysis with water. The preferred organosilanes of choice are gamma-methacryloxypropyl trimethoxy silane and vinyl tri(beta-methoxyethoxy)-silane.

The silanes are applied to the metal particles in solution. After preparation of the metal particles by either Raney or Heusler techniques, the particles are transferred to an organic solvent such as $C_6$–$C_8$ normal alkanes, e.g. hexane heptane, $C_6$–$C_8$ aromatics, e.g. benzene, toluene, xylene, carbon tetrachloride, trichloromethane or mineral spirits. The silane is then added to the solution with constant stirring for about 1 to about 10 minutes. Preferably, about 0.01 to about 1 wt. percent silane based on the metal is used; more preferably, about 0.05 to about 0.5 wt. percent, most preferably about 0.1 to about 0.2 wt. percent, e.g. 0.1 wt. percent. After silane treatment, the metal may be removed from the solvent by filtration, centrifugation or other mechanical means and safely handled as a powder. The organosilane attaches itself to the metal surface, prevents reaction of the metal powder with air.

It has been found that at least 0.1 part of metal powder must be blended into 100 parts of elastomer in order to effectively cure the elastomer by microwave heating. Preferably 0.2 phr. to about 18 phr., based on the elastomer, of metal powder is blended into the elastomer; more preferably about 0.5 phr. to about 5 phr.; most preferably about 0.5 phr. to about 1.5 phr., e.g. 1 phr.

In adition to the metal powder, various curatives, compounding aids and extender oils may be incorporated into the elastomer. Any curative known to the art may be used for the various wire coating materials suitable for use in the practice of this invention.

For example, elastomers such as butyl rubber or EPDM may be sulfur cured by such curatives as heavy metal dialkyl dithiocarbamates and quinoid compounds. Typically, in the vulcanizing of EPDM suitable sulfur cure may be obtained by the use of certain heavy metal dialkyl dithiocarbamates in conjunction with a thiourea, a metal oxide and mercapto-benzothiazole as cure activators.

Typical of the metal oxide cure activators which may be used are ZnO, $PbO_2$ and MgO. Preferably the metal oxide cure activator is used at about 2.5 to about 10 phr., based on the rubber, more preferably about 4 to about 6 phr., e.g. 5 phr.

The heavy metal thiocarbamates usable in this invention have the general formula:

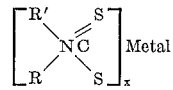

wherein R is an alkyl group having from 1 to 4 carbon atoms and preferably 1 to 2 carbon atoms; R' is an alkyl, aryl, alkaryl or cycloparaffin group having from 1 to 10 carbon atoms and is preferably an alkyl group having 1 to 4 carbon atoms; x is the valence of the heavy metal and can be an integer of 2 to 4; the heavy metal is selected from those elements in groups I–B, II–B, IV–A, V–A, VI–A and VIII of the Periodic Chart of the Elements as published on pages 56 and 57 of the Handbook of Chemistry by Lange, 8th edition, 1952.

The dithiocarbate salt may be a single salt or a mixture of salts, e.g. zinc dimethyl dithiocarbate (methyl zimate) may be combined with tellurium diethyl dithiocarbate (Tellurac). Other dithiocarbamates that are suitable for the purposes of this invention include selenium diethyl thiocarbamate, lead dimethyl dithiocarbamate, tellurium benzyl dithiocarbamate, zinc butyl dithiocarbamate, etc. For best results, the thiocarbamate portion of the blend should comprise either the zinc or tellurium salt alone or a combination of these salts.

The thiocarbamates are used in a range of about 1 to about 5 phr. based on the EPDM, preferably about 2 to about 5 phr. and most preferably about 3 to about 4 phr. Typically, mixtures of dithiocarbamates comprising about 0.5 to about 1.5 phr. of tellurium diethyl dithiocarbamate, e.g. 0.8 phr., may be used in conjunction with about 2 to about 4 phr., based on the EPDM, e.g. 3 phr., of zinc dimethyl dithiocarbamate.

Illustrative of the thioureas which may be used in the practice of this invention are thiocarbanilide (A–1), 1,3-diethyl thiourea (Pennzone E), 1,3-dibutyl thiourea (Pennzone B). Preferably, the thioureas are used in the range of about 1 to about 5 phr. based on the EPDM, more preferably about 2 to about 5 phr., e.g. 3 phr.

Mercaptobenzothiazole is also used as a cure activator.

Typically, the mercaptobenzothiazole is used at about 0.5 to about 3 phr. based on the EPDM; preferably about 1 to about 2 phr., e.g. 1.5 phr.

Other additives which may advantageously be used in the practice of this invention are various conventional rubber processing aids and plasticizers such as paraffinic or naphthenic process oils, microcrystalline waxes, tributyl ethyl phosphate (KP 140), methyl hydroxy stearate (Paricin-1) and vulcanized vegetable oil such as that produced by the reaction of soya oil with sulfur monochloride (Factice 57–S). The term "microcrystalline wax" as used in this specification means petroleum derived waxes characterized by the fineness of their crystals in distinction to the larger crystals of paraffin wax.

The term "quinoid compound" means any dinitroso compounds, dioximes and similarly related compounds having an ortho or para quinoid aromatic nucleus or compounds which can be converted into such structure. Illustrative of these quinoid compounds are poly-p-dinitrosobenzene (Polyac), N - methyl-N,4-dinitrosoaniline (Esastopar), N - (2 - methyl - 2-nitrosopropyl) 4-nitrosoaniline (Nitrol) and p-quinone dioxime (GMF).

The saturated synthetic polymers such as ethylene propylene rubber, polypropylene and polyethylene are peroxide curable. Suitable peroxides are those well known in the art for crosslinking these materials such as di-tert.-butyl peroxide, 2,5-dimethyl-2,5-bis-(tert.-butyl peroxy) hexane, 2,5-dimethyl-2,5-bis-(tert.-butyl peroxy) hexyne-3, benzoyl peroxide, di - tert.-butyl-diperphthalate, tert.-butyl perbenzoate, dicumyl peroxide, cumene hydroperoxide, 2,4-di-(tert.-butyl peroxyisopropyl) benzene, tert.-butyl cumyl peroxide, etc. and mixtures thereof.

It is common practice to propagate electromagnetic radiation in a wave guide by means of coaxial line/wave guide coupling. The outer conductor of the coaxial line is connected to an outer wall of the wave guide while the center conductor protrudes into and terminates in the free space within the wave guide. Similarly, the coaxial line can act as a "pick up" for microwaves flowing through the wave guide. The wave guide is closed at the "coupling" end and the center conductor of the coaxial line is located about ¼ wave length of the microwaves being transmitted, from the closed end of the wave guide.

Within the coaxial line radiation is between the center conductor and the outer conductor of the coaxial line in a radial direction. By this manner, microwaves may be transmitted in much the same way a current is transmitted along an electrical conductor.

In the practice of this invention, a modified coaxial line/wave guide coupling unit is utilized to heat the aforementioned vulcanizable polymer. For example, the coaxial line may be extended to either side of the wave guide, the wire to be coated acting as the center conductor of the coaxial line. To avoid large power losses, it is necessary to attenuate or suppress the radiation traveling along the coaxial line.

Referring now to the drawing, in particular FIG. I, numeral 11 designates a spool of electrical conducting wire, 12. The wire, 12, is passed through a cross head extruder die, 13, wherein the wire, 12, is coated with the curable composition of this invention, said coated wire, 14, being passed through a rectangular wave guide, 15, having an enclosed end, 16. Extending to either side of the wave guide, 15, and concentric with the coated wire, 14, are outer conductors, 17 and 18, of a coaxial line. The coated wire acts as the center conductor of the coaxial line. A microwave generator, 19, is coupled with the wave guide, 15, through an isolator, 20, and variable attenuator, 21, and propagates a wave of electromagnetic radiation through the wave guide, 15, toward the coated wire, 14.

The portion of the coated wire within the wave guide is heated directly by the electromagnetic radiation which is also picked up by the center conductor wire, 14, of the coaxial line. Radiation between the center conductor, 14, and the outer conductors, 17 and 18, of coaxial line continues to heat and cure the coating throughout the external (to the wave guide) heating zones, 22 and 22', until said radiation is suppressed or attenuated by the baffles, 23, or resonating cavities, 24.

The baffles attenuate the electromagnetic radiation by creating a mismatch between the center and outer conductors of the coaxial line. The resonating cavities impede or suppress the radiation by absorption of energy. In practice, it is preferred to combine both suppression means by utilizing alternating cavities and baffles.

Referring to the drawing, in particular to FIG. 11a, numeral 17 designates the outer conductor of the coaxial line. Connected to the conductor, 17, is a series of resonating cavities, 24. The width of the cavity, 25, is $\lambda/4$, i.e. one quarter of the wave length of the electromagnetic radiation. The inner diameter of the cavity can be equal to or greater than that of the outer conductor, 17. Preferentially, this diameter should be equal to the width of the cavity. The cavity, 24, extends circumferentially about the inner conductor, 14. The inner surface of the section connecting the cavities is coated with a low dielectric loss polymer having a low coefficient of friction, e.g., Teflon, 26. The diameter of this Teflon coated section, C, is sized to that of the finished wire and acts as a forming die to contain the coating which has a tendency to expand upon curing. The diameter of the cavity, 24, is $2r$ where $r=2C$. The distance between cavities, 28, is not critical.

Baffles are somewhat similar to the resonating cavities discussed above. Referring to the drawing, in particular FIG. IIb, numeral 18 designates the outer conductor of a coaxial line. Connected to the conductor, 18, is a series of baffles, 23. The width of the baffle, 29, is $\lambda/4$, i.e. one quarter of the wave length of the electromagnetic radiation. Where the resonating cavities, 24, provide a space within the system, the baffles, 23, present a restriction and impede radiation in a manner similar to throttling the flow of fluid in a line. The baffles are connected by sections of insulating material, 30, e.g. Teflon. The diameter of which, C, is the diameter of the finished wire. The baffle diameters is $2r$, where $r=2C$.

In its preferred embodiment the radiation suppression means constitutes a series of alternating baffles, 23, and cavities, 24, as shown in FIG. IIc. Transition sections, 31, the dimensions of which are not critical, are required between the resonating cavities and baffles.

The following examples serve to illustrate the manner in which the process of this invention may be carried out and the benefits derived therefrom.

EXAMPLE 1

A butyl rubber composition having the formulation shown below was perpared using conventional blending techniques.

| Component | Parts by weight |
|---|---|
| Enjay Butyl 035 [1] | 100 |
| Calcined clay | 110 |
| Iron particles (av. 5μ) | 4 |
| $Pb_3O_4$ | 5 |
| Paraffin wax [2] | 5 |
| LM polyethylene [3] | 5 |
| Quinone dioxime | 1.5 |
| Mercaptobenzothiazole | 4 |

[1] Butyl rubber having 0.8 mole percent unsaturation and a Mooney viscosity at 212° F. of about 41–49.
[2] A petroleum derived paraffin wax having a melting point of 135° F.
[3] A low molecular weight polyethylene having a molecular weight of about 20,000 to 50,000 (weight average).

This composition is extruded at about 200° F. through a cross head extruder die having a ¼ inch diameter bore onto a ⅛ inch diameter wire. The coated wire is passed through the unit described above wherein 2L (FIG. I) is four (4) feet and C (FIG. II) is 0.275 inch.

The microwave generator operates at 2450 mHz. and 5 kw. microwave power. The total curing time in the heating zone is about 20 seconds, i.e. line speed ca. 12 ft./min.

EXAMPLE 2

A 1/16 inch diameter wire is coated with the ethylene propylene rubber composition shown below by passing the wire through a cross head extruding die having a 1/8 inch diameter bore, the EPR being extruded at about 200° F.

| Component | Parts by weight |
|---|---|
| Enjay Vistalon 404 [1] | 100 |
| Calcined clay | 110 |
| Aluminum particles (av. $5\mu$) | 5 |
| $Pb_3O_4$ | 5 |
| Dicumyl peroxide | 2.8 |
| Triallyl cyanurate | 1.5 |

[1] Ethylene propylene rubber having an ethylene content of 40–46 wt. percent and a Mooney viscosity at 212° F. of about 35–45.

The microwave unit of Example 1 is used except that 2L equals 2 ft., C is 0.135 inch and the line speed is about 6 ft./sec., i.e. curing time 20 seconds.

The coated wires produced by the method of Examples 1 and 2 are equivalent in physical and electrical characteristics to conventionally coated wires.

Since it is readily evident that many different embodiments may be made without departing from the spirit of this invention, it is not intended to limit the scope thereof to the particular embodiments disclosed herein.

What is claimed is:

1. A process for preparing an insulated electrical conductor which comprises:
    (a) coating the electrical conductor with the curable composition which comprises:
        (1) a polymer selected from the group consisting of natural rubber, butyl rubber, halogenated butyl rubber, ethylene-propylene rubber, ethylene-propylene diene monomer, polyethylene, polyvinyl chloride and mixtures thereof; and
        (2) about 0.1 to about 18 parts by weight per 100 parts of polymer of metal particles less than 10 microns in diameter wherein the metal is tin, zinc, lead, aluminum, a metal selected from the group consisting of Group I–B and Group VIII of the Periodic Table of the Elements, or mixtures thereof;
    (b) passing said coated conductor through a microwave heating unit, said coated conductor being spacially oriented in said microwave heating unit so as to couple the microwave energy to said conductor thereby converting said coated conductor to the center conductor of a coaxial line, the outer wall of said microwave heating unit being the outer conductor of said coaxial line;
        said coated conductor being within said microwave heating unit for a time sufficient to cure said curable composition.

2. The process of claim 1 wherein said microwave generator operates at a frequency of about 915 to about 2450 mHz. and said wave guide is a rectangular wave guide.

3. The process of claim 1 wherein leakage from said microwave heating unit is suppressed by means comprising at least three baffles in series.

4. The process of claim 1 wherein leakage from said microwave heating unit is suppressed by means comprising at least three resonating cavities in series.

5. The process of claim 1 wherein leakage from said microwave heating unit is suppressed by means comprising an alternating combination of baffles and resonating cavities comprising at least one baffle.

6. The process of claim 1 wherein said microwave heating unit operates at a frequency of about 800 to 30,000 mHz.

7. The process of claim 6 wherein the microwave frequency range is about 900 to 8600 mHz.

References Cited

UNITED STATES PATENTS

| | | | |
|---|---|---|---|
| 2,393,541 | 1/1946 | Kohler | 219—10.41 |
| 2,448,676 | 9/1948 | MacMillin et al. | 264—26 |
| 2,718,580 | 9/1955 | Shirley | 219—10.55 |
| 2,739,351 | 3/1956 | Henning | 264—26 |
| 3,249,658 | 5/1966 | Hodges | 264—236 |
| 3,281,515 | 10/1966 | Schmitz | 264—126 |
| 3,457,385 | 7/1969 | Cumming | 219—10.61 |

OTHER REFERENCES

"Microwave Power for Fast Curing," Rubber and Plastics Age, vol. 44, No. 5, p. 525, May 1963.

WILLIAM D. MARTIN, Primary Examiner

R. M. SPEER, Assistant Examiner

U.S. Cl. X.R.

117—93.31, 232; 219—10.55